UNITED STATES PATENT OFFICE.

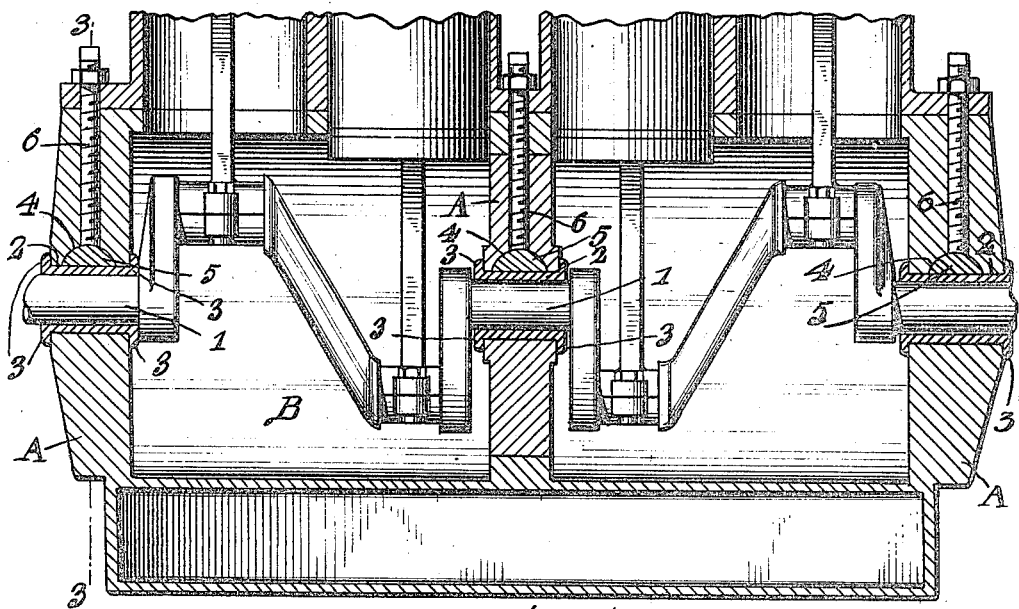
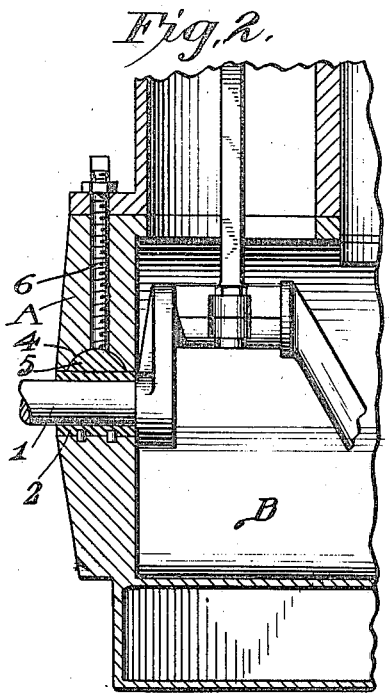
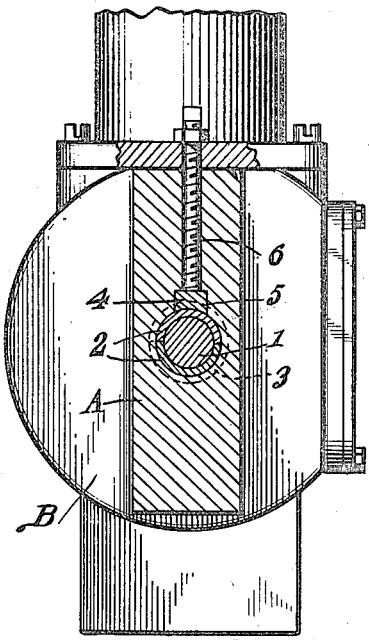

HAMILTON G. BLUMBERG, OF SAN ANTONIO, TEXAS, ASSIGNOR TO BLUMBERG MOTOR MANUFACTURING COMPANY, OF ORANGE, TEXAS, A CORPORATION OF TEXAS.

BEARING FOR CRANK-SHAFTS.

1,282,672.	Specification of Letters Patent.	Patented Oct. 22, 1918.

Application filed September 24, 1918. Serial No. 255,498.

*To all whom it may concern:*

Be it known that I, HAMILTON G. BLUMBERG, a citizen of the United States, and resident of San Antonio, in the county of Bexar and State of Texas, have invented certain new and useful Improvements in Bearings for Crank-Shafts, of which the following is a specification.

This invention relates to an improvement in bearings for crank shafts and the like, and the object is to provide means for tightening the bushings of the bearings easily and quickly when necessary.

The invention relates to still other novel features of construction and combinations of parts which will be hereinafter more fully described and pointed out in the claim.

In the accompanying drawings:

Figure 1 is a view in section, showing the bushings applied to the drawings;

Fig. 2 is a detail sectional view, showing a slightly different form of bearing; and Fig. 3 is a transverse sectional view showing the manner of adjusting the bushings.

A represents the bearings or castings, in which a crank shaft 1 is journaled. The bearings and crank shaft are preferably located within the crank case B.

Mounted in the bearings, and encircling the shaft, are split bushings 2, 2.

The bushings shown are preferably made in two sections, and are provided with right-angular flanges 3, 3 which engage the edges of the bearings for maintaining the bushings in position and against lateral movement.

Each bearing or casting A is provided with an elongated slot or recess 4, which is formed above one of the split bushings.

A steel arch or block 5 is received in the slot or recess 4, and a screw bolt 6 extending through the casting or bearing A has engagement with the arch or block for forcing it against the shaft for the purpose of taking up the wear.

These bolts preferably extend through the casing, so that the bushings can be tightened whenever it is necessary without taking down the engine. At present, in adjusting the bearings on most engines, as applied to automobiles, a great deal of time is consumed in taking down the engine for the purpose of tightening the bearings, because the means for adjusting the bushings are inaccessible, but by extending the adjusting screws to a position where they are accessible for tightening the bearings, this objection is overcome.

With an attachment of this character, the bearings can be tightened easily, and in a very short time, which means a great saving in the time consumed in tightening the bearings under the present methods.

Under the present conditions, on many machines, it will take three men a day or a day and a half to tighten these bearings, whereas with this invention, it is possible to tighten all of the bearings by simply raising the hood and applying a wrench to the heads of the screws, and rotating them.

In the modification shown in Fig. 2, instead of showing the bearing made in two sections, I have shown the bearing in the form of a split ring. The same effect will be had with the use of either bearing, as each will receive the pressure of the adjusting screw which is distributed thereover by the arched lock.

I claim:

The combination with a crank casing and bearings, of a crank shaft journaled in the bearings, split bushings received in the bearings and around the shaft, said bearings having recesses formed therein, above the bushings, blocks received in said recesses, and means extending through the bearings and crank casing engaging the blocks for exerting a pressure upon said bushings.

H. G. BLUMBERG.